Inventors:
Theodore Foster
Walter J. Wake
By: Walter J. Schlegel, Jr.
Atty

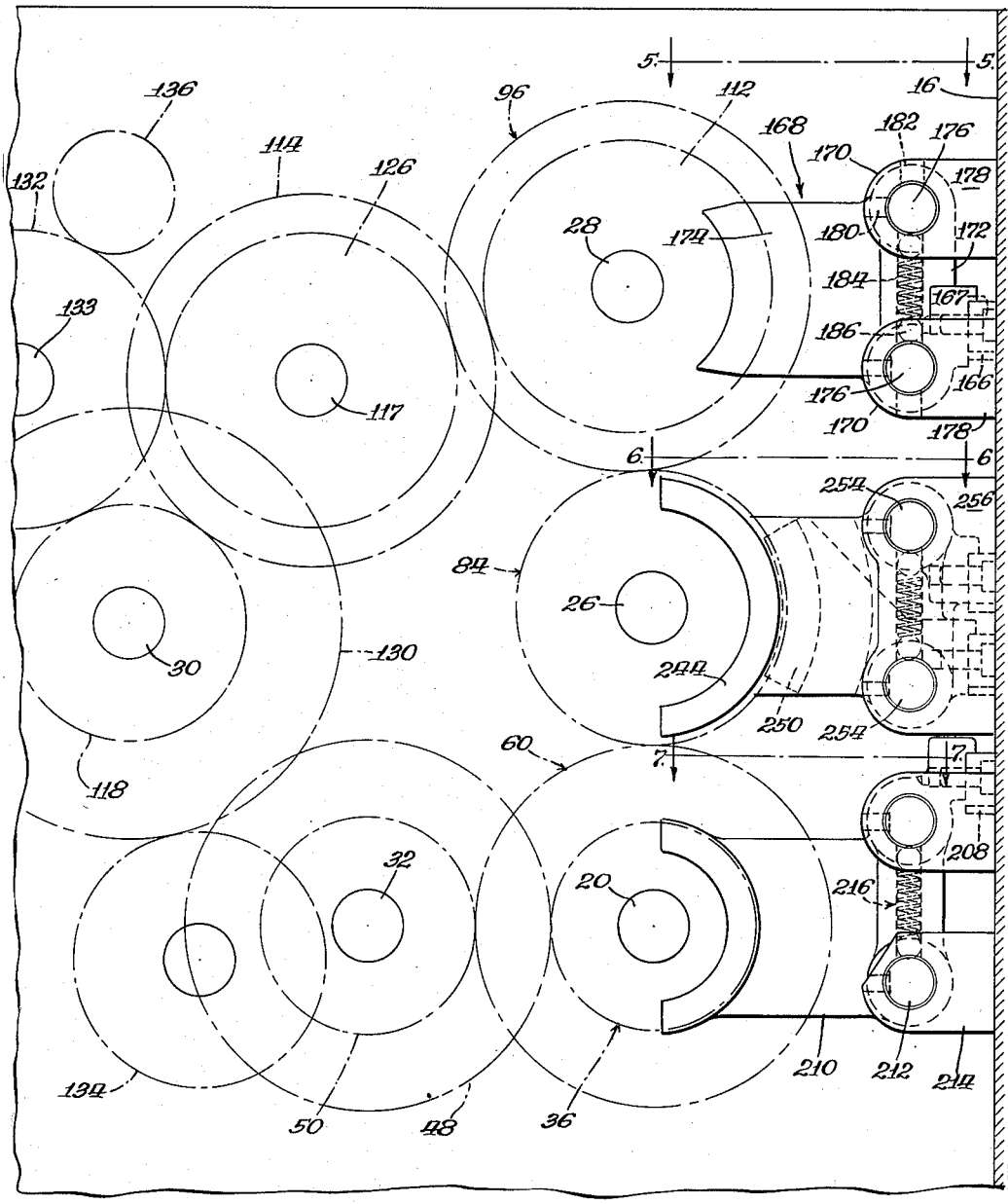

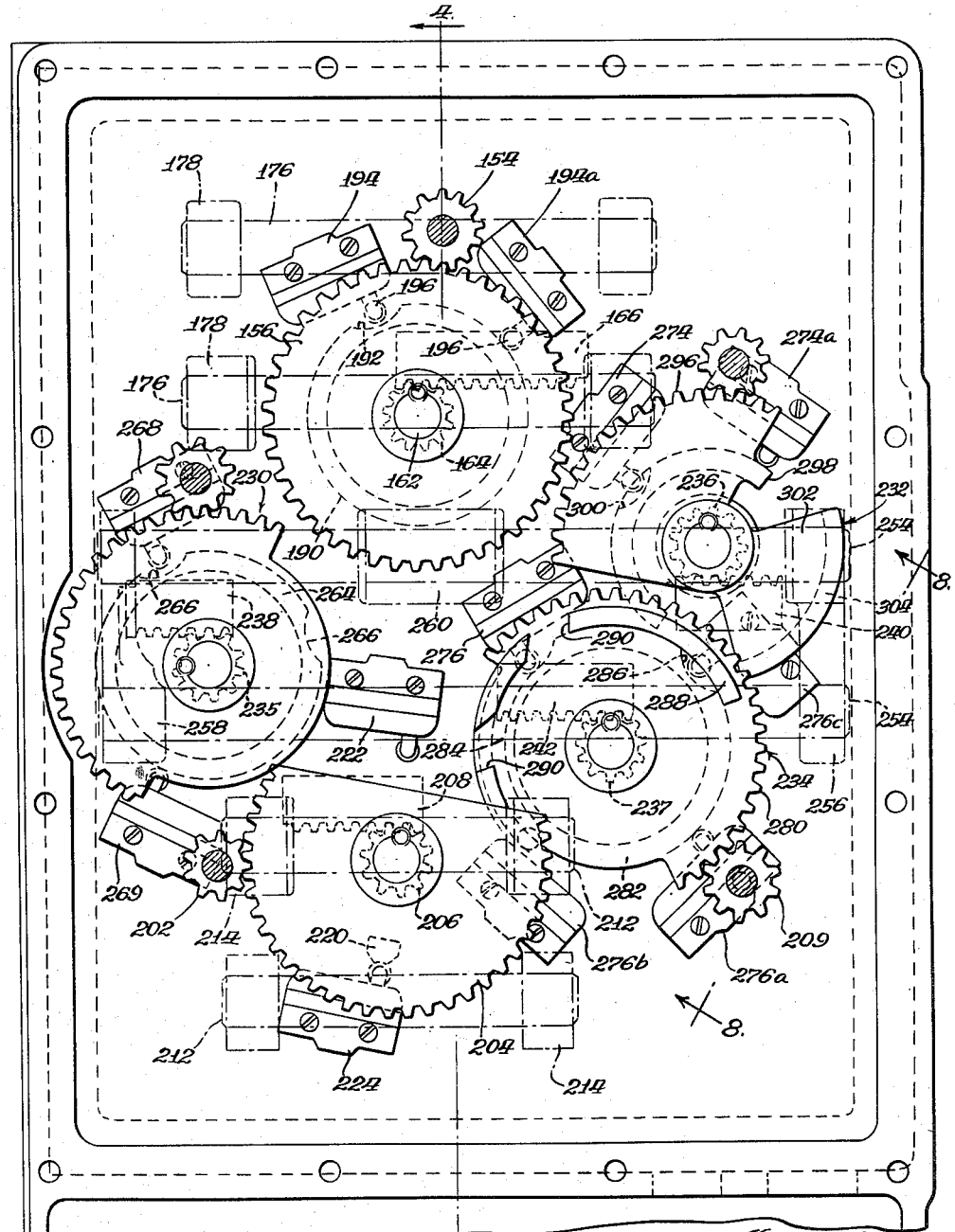

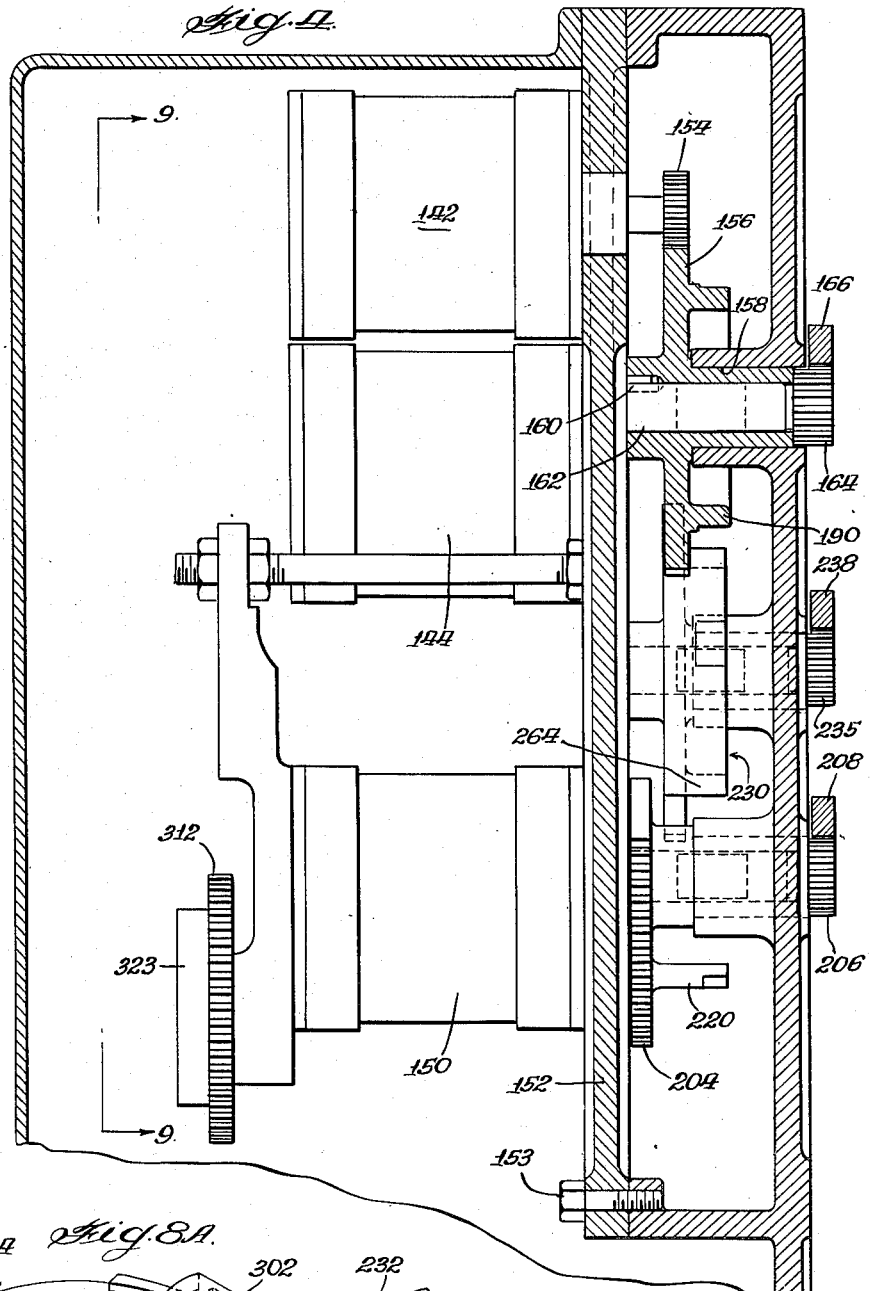
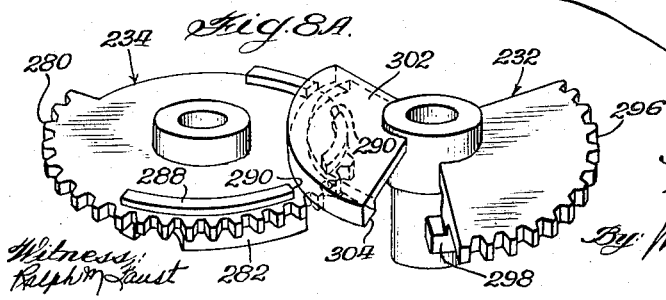

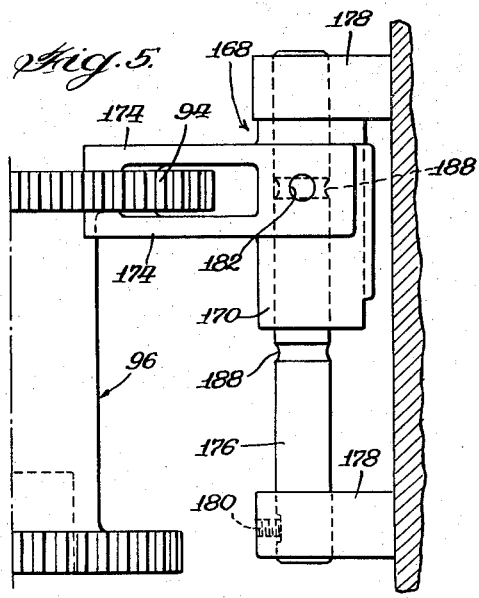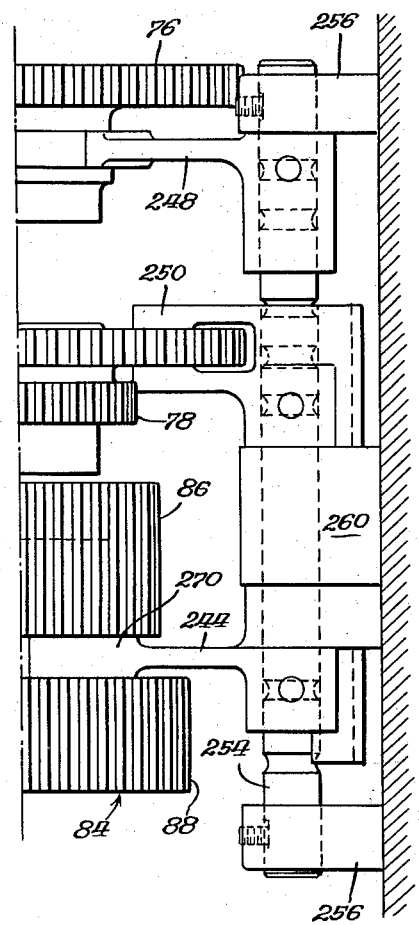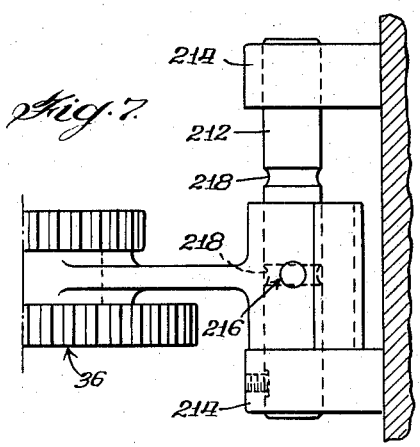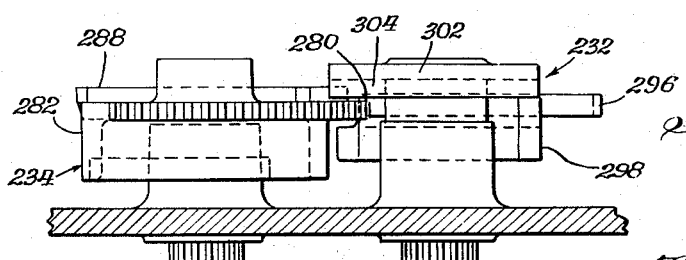

Aug. 2, 1960     T. FOSTER ET AL     2,947,189
FEED BOX TRANSMISSION

Filed Aug. 23, 1957     7 Sheets-Sheet 6

Inventors:
Theodore Foster
Walter J. Wake
By: Walter S. Schlegel, Jr.
Atty

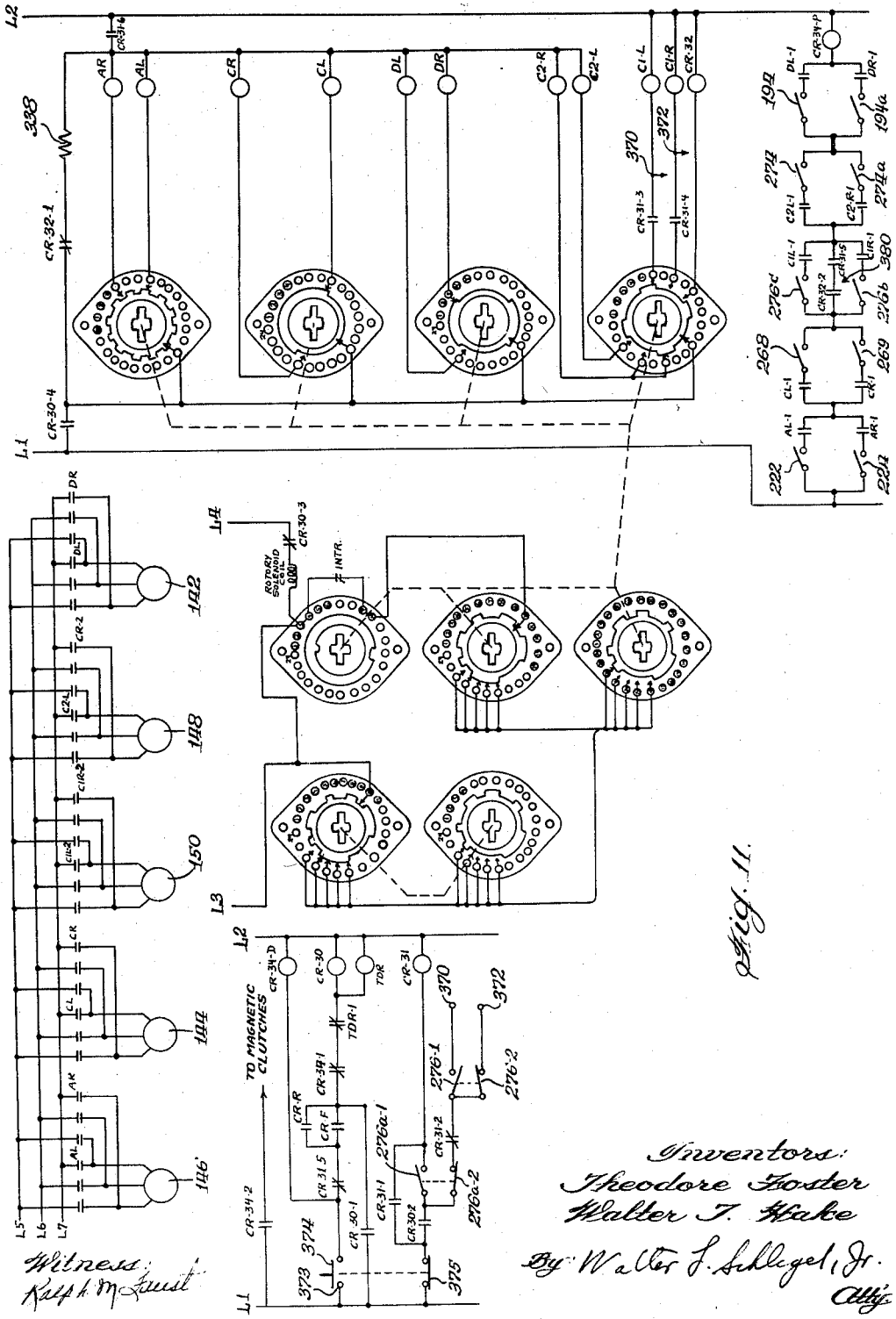

United States Patent Office 2,947,189
Patented Aug. 2, 1960

2,947,189

FEED BOX TRANSMISSION

Theodore Foster, Montgomery, and Walter T. Hake, White Oak, Ohio, assignors to American Steel Foundries, Chicago, Ill., a corporation of New Jersey Filed Aug. 23, 1957, Ser. No. 679,882

10 Claims. (Cl. 74—342)

This invention relates to transmission systems and more particularly to novel transmission means for driving and controlling the feed rate of a tool carrying member.

Although the device of this invention may be utilized to advantage wherever a wide range of output speeds are required, the particular embodiment disclosed herein is shown, by way of example, as applied to a vertical boring and turning machine.

A primary object of the present invention is the provision of a novel transmission system including axially movable gears wherein the latter are shifted by means of individual motor means.

A further object of the invention is the provision of a gear shifting arrangement including individual power means for each shifting gear and also including novel position responsive means for stopping the power means at the proper time.

Still another object is the provision of a transmission having an input shaft and an output shaft and wherein rotation of the input shaft in either direction is transmitted to the output shaft in one direction only by means of opposed overrunning clutches.

It is a further object of the present invention to provide a novel transmission affording a wide range of output speeds with relatively few shiftable gears.

It is a further object of the present invention to provide a transmission which is readily adaptable to automatic control and wherein the shifting mechanism is extremely simple and rapid in operation and contains only a few moving elements.

Other objects and advantages will be apparent from the following specification and accompanying drawings, wherein;

Figure 2 is a partially schematic side elevational view of the structure shown in Figure 1 illustrating the correct physical relationship of the various shafts;

Figure 3 is a rear elevational view of the structure of Figure 1 illustrating the gear segments and related structure of the shifting arrangement but with the torque motors removed for clarity;

Figure 4 is a fragmentary sectional view taken substantially along line 4—4 of Figure 3;

Figure 5 is a view along line 5—5 of Figure 2;

Figure 6 is a view along line 6—6 of Figure 2;

Figure 7 is a view along line 7—7 of Figure 2;

Figure 8 is a fragmentary view along line 8—8 of Figure 3 illustrating the interlocking gear segments;

Figure 8a is a top view of Figure 8;

Figure 11 is an electrical wiring diagram illustrating the manner in which the feed box transmission is automatically controlled.

Figure 1:
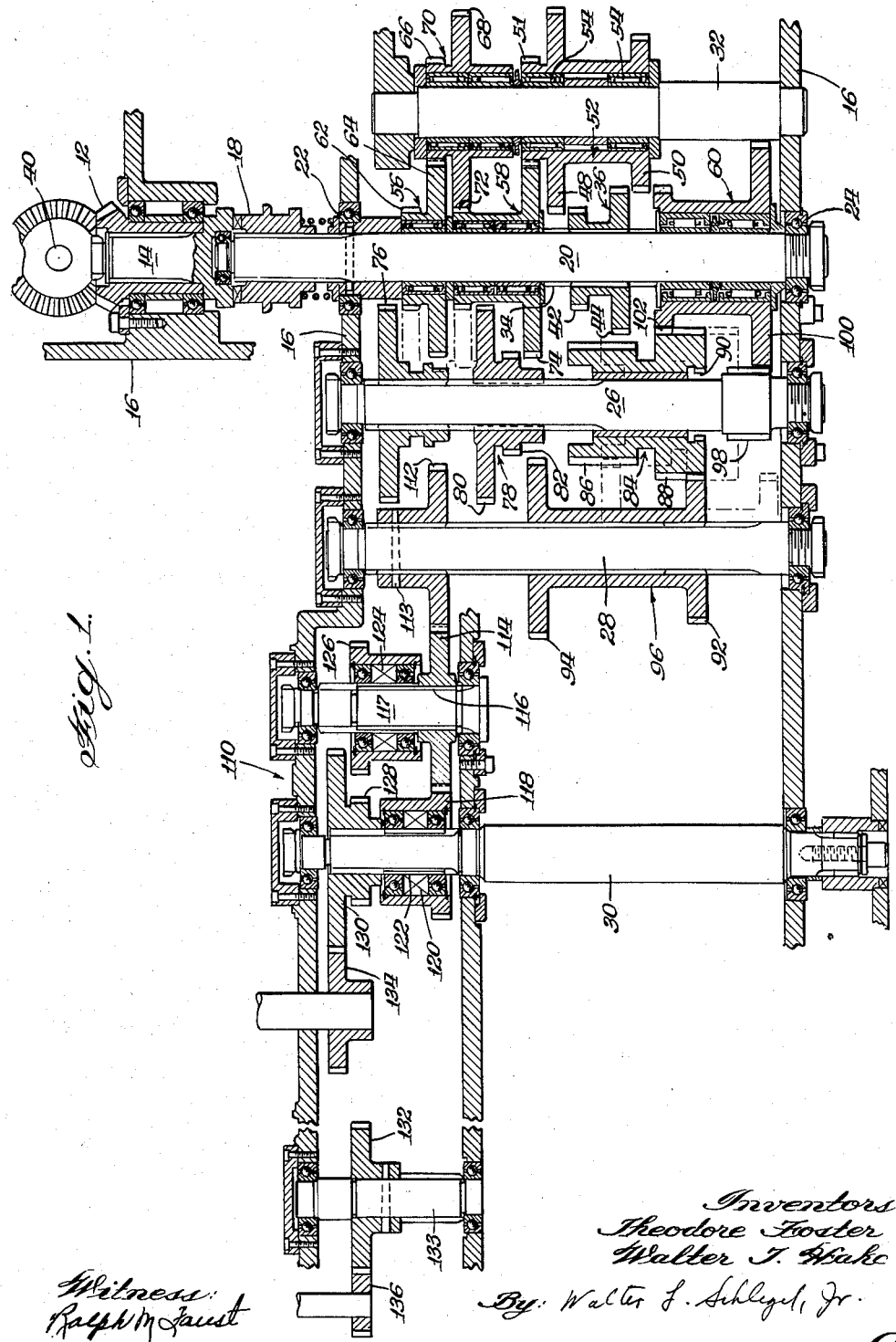
Figure 1 is a fragmentary detail view illustrating the internal construction of the novel feed box transmission, the various shafts being shown in plan and out of their true three dimensional relationship to more clearly illustrate their operation.

The feed box transmission to be described hereinafter is particularly applicable to a metal cutting machine such as is described in detail in copending application Serial No. 492,382 filed March 7, 1955, in the name of Theodore Foster et al., the subject matter of which is incorporated herein by reference. When utilized in conjunction with a machine such as this, the power for the feed box transmission is supplied from a work-supporting-table transmission through suitable gearing whereby the feed box transmission is mechanically interlocked with the rotation of the work-supporting-table of the machine. This power is transmitted to drive shaft 40 (Figure 1) which in turn transmits its motion by means of bevel gears 12, one of which is keyed to the shaft 40 and the other of which is keyed to a shaft 14 journalled in a portion of the feed box housing 16. Shaft 14 in turn transmits its motion through a single tooth clutch 18 to input shaft 20 which is journalled as at 22 and 24 in internal walls of the feed box housing 16. The single tooth clutch 18 is utilized for thread chasing only so that the tool may always be engaged with the workpiece at the same rotational position of the table whereby damage to the threads will be obviated. As thread chasing has been described in the aforementioned copending application and is not a part of this invention, the single tooth clutch 18 will be presumed to be engaged at all times and the mechanism whereby the clutch might be engaged and disengaged is omitted. Also journalled in the feed box housing 16 are splined shafts 26 and 28 and also an output shaft 30. A back shaft 32 is also provided and this shaft is nonrotatably carried in the housing 16.

The input shaft 20 is provided generally centrally thereof with a splined portion 34 which carries for axial movement therealong a gear unit 36 which is rotatable with the shaft 20. The gear unit 36 is shiftable in a manner to be described hereinafter to one of two alternate positions and comprises a small gear 42 and a large gear 44 selectively and respectively engageable with a large gear 48 and a small gear 50 of a gear unit 52 which is rotatably mounted on shaft 32 by means of needle bearings 54. Journalled in a conventional manner for rotation on input shaft 20 are a plurality of gear units 56, 58, and 60. The gear unit 56 comprises a small gear 62 and a large gear 64, the large gear being engageable with a small gear 66 formed on a gear unit 70. The gear unit 58 comprises a small gear 72 and a large gear 74. The small gear 72 is engageable with a large gear 68 of gear unit 70 and the large gear 74 is engageable with a third gear 51 on the gear unit 52.

Referring to the gears which have already been described, it is seen that the gear unit 58 may be rotated at ½ the speed of shaft 20 by providing 45 teeth on gears 44 and 50 and 30 and 60 teeth on gears 51 and 74, respectively. This reduction occurs when the gear unit 36 is shifted to the left as seen in Figure 1. In the descriptive material, motion of a shiftable gear to the left will indicate movement in a direction away from the drive shaft 40 and movement to the right will indicate shifting movement in a direction toward the drive shaft 40, in both cases as viewed in Figure 1. Alternately, the gear unit 58 may be caused to rotate at ¼ the speed of shaft 20 by moving the gear unit 36 to the right and providing 30 teeth on gear 42 and 60 teeth on gear 48.

Gear unit 56 always rotates at ¼ the speed of gear unit 58 and this is accomplished by providing 30 teeth on gears 72 and 66, and 60 teeth on gears 68 and 64. The gear unit 56, consequently, is rotatable at either ⅛ or 1/16 of the speed of shaft 20. It will be understood that all of the gear ratios set out herein are merely by way of illustration and not limitation and that other gear ratios or combinations may be provided where expedient from the standpoint of the particular machine to which the invention is to be applied.

The motion of gear unit 56 is selectively transmittable through gear 62 to a gear 76, at a ratio of preferably 2:1, the gear 76 being a shiftable gear which is splined on shaft 26 for rotation therewith and also for axial movement therealong. When gears 62 and 76 are engaged, selective reduction of 1:16 or 1:32 is provided between the shafts 26 and 20.

Also splined on the shaft 26 is a gear unit 78 which is provided with a large gear 80 and a small gear 82. The large gear 80 may be provided with 60 teeth and is selectively engageable with the 30 tooth gear 72. When gears 80 and 72 are engaged the shaft 26 is rotatable at a speed of either ¼ or ⅛ of the speed of shaft 20 depending on the position of the gear unit 36. The gear 82 is provided with 30 teeth and is selectively engageable with the 60 tooth gear 74 whereby the shaft 26 can be rotated at a speed equal to the speed of shaft 20 or at ½ the speed of shaft 20 depending on the position of gear unit 36.

It is evident, therefore, that with the gearing thus far described, the shaft 26 can be made to rotate at the same speed as shaft 20 or at ½, ¼, ⅛, ⅟₁₆, and ⅟₃₂ the speed of shaft 20. It should also be noted at this time that whereas the gear 76 may be shifted to one of two positions, the gear unit 78 may be shifted to the right, to the left, or to a neutral position. Furthermore, because of the fact that both of the gears 76 and 78 are splined to shaft 26, the gear unit 78 must be in neutral position when gear 76 is engaged with gear 62. To accommodate this feature, a mechanical interlock is provided which shall be described in detail hereinafter in conjunction with a description of the gear shifting mechanism.

Journalled for rotation on the shaft 26 is a shifting gear unit 84 which is provided with a small diameter elongated gear 86, preferably having 36 teeth, and also provided with a large diameter elongated gear 88, preferably having 45 teeth. The gear unit 84 is shiftable to either a left or right position and, when shifted to the right, rotates independently of shaft 26 but, when shifted to the left, is rotatable with shaft 26 by the engagement of a toothed clutch arrangement indicated at 90. The gear 88 is selectively engageable at a 1:1 ratio with a gear 92 which is part of a shifting gear unit 96 splined on shaft 28 for rotation therewith and for axial movement therealong. When gears 88 and 92 are engaged by shifting the gear unit 84 to the left, the six available speeds of shaft 26 are transmitted at a 1:1 ratio directly to shaft 28.

Similarly, the gear 86 is selectively engageable with a gear 94, preferably having 54 teeth, formed on the end of the gear unit 96 opposite to the gear 92. When gears 86 and 94 are engaged by shifting the gear unit 96 to the left (shown in phantom), the six speeds of shaft 26 are divided by 1½ while being transmitted to shaft 28.

Formed preferably integrally with shaft 26 is a gear 98 having in this particular embodiment 21 teeth. This gear is engageable with a 70 tooth gear 100 formed at one end of the gear unit 60 which, as described heretofore, is rotatable on and independently of input shaft 20. Formed on the end of gear unit 60 opposite to the gear 100 is a smaller diameter gear 102 preferably having 45 teeth, the latter gear being engageable with the gear 88 when gear unit 84 is shifted to the right. When the gear unit 96 on shaft 28 is also shifted to the right, it is seen that the motion of shaft 26 is transmitted through gear 98 to gear 100 at a reduction of 3.33:1 and thence through gear 102 to gear 88 and thence through gear 88 to gear 92, both at 1:1 ratios. Utilizing this particular setup imparts a rotary speed to shaft 28 which is equal to the speed of shaft 26 divided by 3.33.

In a similar manner, shaft 28 may be driven at ⅕ of the speed of shaft 26 by shifting gear unit 84 to the right and gear unit 96 to the left. In this instance, the speed of shaft 26 is divided by 3.33 by means of engaged gears 98 and 100 and divided further by 1½ by means of the engaged gears 86 and 94, the combined reduction being equivalent to a 5:1 reduction.

From the foregoing description of the various gear trains, it is seen that shaft 28 may be selectively driven at any one of 24 different speeds for any given input speed of shaft 20.

If, in the particular adaptation of the feed box transmission disclosed herein, namely in conjunction with a vertical boring and turning machine or vertical boring mill, the boring mill table were always rotated in the same direction, then the output shaft 30 could be driven directly from shaft 28. However, this is not generally the case and, in actual practice, it is customary for the table to be rotated in either direction. In the latter instance, confusion would arise because, when the machine operator depressed the "In" button of the control panel, the tool carrying head would move toward the rotational axis of the workpiece if the table were rotating "Forward" but would move away from the rotational axis if the table were rotating in "Reverse." It is obvious, therefore, that the tool carrying member should move in the proper direction as indicated, regardless of whether the table is rotating in either a forward or reverse direction. For this reason, the reversing structure indicated generally at 110 is provided in the embodiment of the feed box transmission disclosed herein.

Referring now to this structure, an output drive gear 112 is pinned at 113 to shaft 28 for rotation therewith. Gear 112 is drivingly engageable with a gear 114 splined as at 116 to a shaft 117 which is journalled in a conventional manner in the feed box housing. Gear 114 is in turn engageable with a gear 118 which carries internally thereof a conventional overrunning clutch 120 which is splined as at 122 to the output shaft 30. By means of the overrunning clutch 120, motion can be transmitted to the shaft 30 in only one direction, in the present instance clockwise, as seen in Figure 2. Keyed to the shaft 117 is another overrunning clutch 124 carrying on the outer periphery thereof a gear 126 adapted to drive, through a reversing gear 132, a compound gear unit 130 which is splined to the shaft 30 for rotation therewith. The reversing gear 132, which is shown in its true position in Figure 2, is pinned to a shaft 133 for rotation therewith, said shaft 133 being journalled in the housing 16. The overrunning clutch 124 is arranged to drive in only one direction and is set oppositely of overrunning clutch 120 so that when shaft 117 and gear 114 are rotating in one direction, their motion will be transmitted through overrunning clutch 120 to output shaft 30 while overrunning clutch 124 is running free. Conversely, when shaft 117 and gear 114 are rotating in the opposite direction because of the fact that the direction of table rotation has been reversed, overrunning clutch 120 is running free and the motion of shaft 117 is transmitted through clutch 124 and gears 126, 132, and 128 to the output shaft 30. It is apparent, therefore, that the output shaft 30 always rotates in the same direction regardless of the direction of table rotation and direction of rotation of input shaft 20.

When the feed box transmission of the present invention is utilized in conjunction with a vertical boring mill, provision is also made to drive the output shaft 30 either at rapid traverse speed or at positioning speed, in each instance by means of an independent motor. The arrangement whereby this is accomplished is not per se a part of this invention but is partially illustrated to show its manner of incorporation and method of operation.

Gear 134 is driven by the rapid traverse motor (not shown) and is engageable with gear 130. The positioning motor (not shown) drives gear 136 which drives gear 130 through an intermediary gear 132 which is pinned to a shaft 133 journalled in the housing 16. In both instances the output shaft 30 is driven at a speed in excess of the feed rate speed of gear 118 and, as a consequence, the clutch 120 merely overruns.

The mechanism by which the shiftable gear units 36, 76, 78, 84, and 96 are shifted is illustrated in Figures 2 through 10, inclusive. Referring first to Figures 2, 3, 4, and 9, it will be seen that the shifting of the gear units to accommodate a desired feed change is accomplished through the use of five torque motors designated 142, 144, 146, 148, and 150, each of the motors being associated with one of the shifting gear units. The power to each torque motor is applied through a reversing contactor and the manner of operation of the torque motors will be explained in conjunction with the wiring diagram of Figure 11. The torque motors are mounted on a motor plate (Figure 4) which in turn is secured to the housing 16 by means of a plurality of cap screws, one of which is indicated at 153.

Describing first the mechanism for shifting gear unit 96, it is seen in Figure 4 that a motor pinion 154 is secured to the shaft of torque motor 142 at the side of plate 152 opposite the motor. The pinion 154 is operatively engageable with a timing gear 156 (Figures 3 and 4) which is rotatably mounted in an internal boss opening 158. The gear 156 in turn carries a rack pinion shaft 162 which is held in position by means of a lock screw 160. Preferably formed integrally with the shaft 162 is a rack pinion 164 which operatively engages a rack 166. The rack 166 is preferably secured by means of one or more cap screws 167 (Figure 2) to a shifter yoke 168. The shifter yoke has not been shown in Figure 4 but is clearly illustrated in Figure 5. The shifter yoke 168 comprises spaced transverse bosses 170 interconnected by a web 172 and spaced arms 174 adapted to clasp the gear 94 of gear unit 96 whereby motion of the shifter fork is transmitted to the gear unit 96. The bosses 170 are slidably received on a pair of spaced parallel yoke support rods 176, each of which is supported at its ends by bosses 178 and are held in position by means of set screws 180. The bosses 178 are secured in any conventional manner (not shown) to an internal wall of the feed box housing 16.

Prior to assembly of the yoke support rods into the bosses 170 of the yoke, the bosses 170 are provided with an opening 182 adapted to receive a spring 184 and a pair of detent balls 186 as best seen in Figure 2. The detent mechanism is held in place by means of the rods 176 at assembly thereof with the yoke and are utilized to hold the yoke and associated gear in either of its two alternate shifted positions. This is accomplished by means of spaced peripheral grooves 188 formed in the rods 176 and adapted to receive balls 186 of the detent unit. The detent unit, while utilized to hold the yoke in its proper position, is not utilized to determine the extreme ends of the stroke of the yoke, this function being accommodated instead by the yoke striking a face of one of the bosses 178.

Referring once again to Figures 3 and 4, it is seen that the timing gear 156 is provided with a hub 190, said hub being utilized as a cam track and provided with a notch 192. Limit switches 194 and 194a are provided, each limit switch having an actuating arm 196 which carries a roller adapted to ride on the outer periphery of the hub 190 and to drop into the notch 192 at the terminus of a shifting movement of the gear unit 96. As will be explained hereinafter, the limit switches are part of an interlocking system which indicates and assures that the gear has been moved to a particular desired position.

The torque motor 146 (associated with gear unit 36) is similarly arranged to rotatably carry a pinion 202 (Figure 3) which is operatively engageable with a timing gear segment 204. The gear segment 204 has certain portions removed, as have certain other of the gear segments, to eliminate interferences which would otherwise occur between various components. The gear segment 204 carries a rack pinion 206 which is operatively engageable with a rack 208 secured to a shifter yoke 210 (Figure 2). The yoke 210 is slidably supported on spaced parallel support rods 212 which are received in bosses 214. A detent assembly 216 is once again provided, the balls thereof being receivable in grooves 218 as best seen in Figure 7. Projecting from the inside face of gear segment 204 is a lug 220 (Figures 3 and 4) adapted to alternately engage the actuating arms of a pair of limit switches 222 and 224.

In a similar manner, the timing gear segments 230, 232, and 234 (Figure 3) are actuatable by means of torque motors 144, 148, and 150 (Figure 9) respectively. These gear segments in turn carry for rotation therewith, rack pinions 235, 236, and 237 (Figure 3) engageable respectively with rack 238 on yoke 244 (Figure 6), rack 240 on yoke 248, and rack 242 on yoke 250.

The three yokes 244, 248, and 250 (as best seen in Figure 6) are carried on a single pair of support rods 254 common to all three yokes. The rods 254 are supported by spaced bosses 256 which are bolted or otherwise secured to the housing 16. A central stop 260 is provided for the purpose of determining the end of the stroke of yokes 244 and 250.

The gear segment 230 (Figures 3 and 4) is provided with a flanged portion 264, the outer peripheral surface of which acts as a cam track having a pair of spaced notches 266 for controlling the opening and closing of limit switches 268 and 269. The yoke 244 (Figure 6) comprises a projecting arm 270 adapted to be received between the gears 86 and 88 of gear unit 84 whereby the motion of the yoke 244 is transmitted to the gear unit.

The gear segments 232 and 234 (Figures 3 and 8) are similarly provided with cam tracks having recessed portions adapted to actuate associated limit switches 274, 274a, 276, 276a, 276b and 276c. However, these latter two gear segments are designed to provide a mechanical interlock so that gear segment 232 can only be rotated if gear segment 234 is in neutral position, and conversely, gear segment 234 can only be rotated into engaged position when gear segment 232 is in the unengaged position. The reason for this interlock is that gear segments 232 and 234 control the shifting movement of gear units 78 and 76. Referring for a moment to Figure 1, it is seen that gear units 78 and 76 are both splined onto the shaft 26 and, therefore, must always rotate at the same speed as the shaft. However, because of the gear trains which have been described heretofore, it will be recalled that gear 76 can only rotate at $\frac{1}{16}$ or $\frac{1}{32}$ of the speed of shaft 20, while gear unit 78 can rotate at $\frac{1}{4}$ or $\frac{1}{8}$ of the speed of shaft 20. Because damage to the system would result if both of these gears should be engaged at the same time, the mechanical interlock between gear segments 232 and 234 is provided.

Referring now to Figures 3, 8 and 8a, it is seen that the segment 234 comprises a gear portion 280 and an axially extending circular flange 282. The flange 282 acts as a cam track for the limit switches 276, 276a, 276b and 276c and is relieved as at 284 and 286 for actuation of the switches. Projecting axially from the gear portion 280 in a direction opposite to the flange 282 is a fragmentary flange portion 288 which is provided with two female milled slots 290, these slots being milled on a radius struck from the axial center line of the gear segment 232.

The gear segment 232 comprises a gear portion 296 which is engageable by the motor pinion of torque motor 150. The gear segment 232 also comprises an axially extending cam track 298 extending through an arc of a circle of approximately 180° and provided with a notch 300. The gear segment is movable to either of two positions, at one of which the gear unit 76 (Figure 1) is engaged with gear 62 and in the other position of which the gear 76 is in a completely neutral position.

The gear segment 232 is also provided with a radially extending segment 302 having a depending peripheral flange 304. The segment 302 and flange 304 are spaced axially from the gear portion 296 and also from the gear portion 280 of gear segment 234, as best seen in Figures 8 and 8a. When the gear segment 234 is in a counterclockwise rotated position from neutral, as illustrated in Figure 3, the gear segment 232 must be in neutral position and must not be able to rotate from that position. The manner in which this is accomplished is shown in Figures 3 and 8a and referring to this figure, it is seen that gear segment 232 is prevented from rotating in a clockwise direction out of neutral position by the interference between the depending flange 304 of gear segment 232 and the flange portion 288 of gear segment 234. The gear segment 232 is prevented from rotating out of neutral position in a counterclockwise direction by the interference between the respective gear portions 279 and 280 which lie in the same radial plane.

Similarly, when the gear segment 234 is rotated out of neutral position in a clockwise direction, the gear segment 232 is prevented from moving out of its neutral position because the flange 304 of gear segment 232 is prevented from moving by the flange portion 288 of gear segment 234.

However, when the gear segment 234 is in the neutral position, as illustrated in Figure 8a, the gear segment 232 is free to rotate because the flange 304 is free to pass through the milled slots 290 which are cut in the flange 288. The gear segment 234 is now prevented from moving out of neutral position by the interference between the outer edges of the cam slots 290 and the flange 304. Thus, it is seen that an interlock has been provided whereby the gear segment 232 is kept in the neutral position when gear segment 234 is in an engaged position and conversely, gear segment 234 is maintained in a neutral position when gear 232 is in the engaged position.

Figure 9:
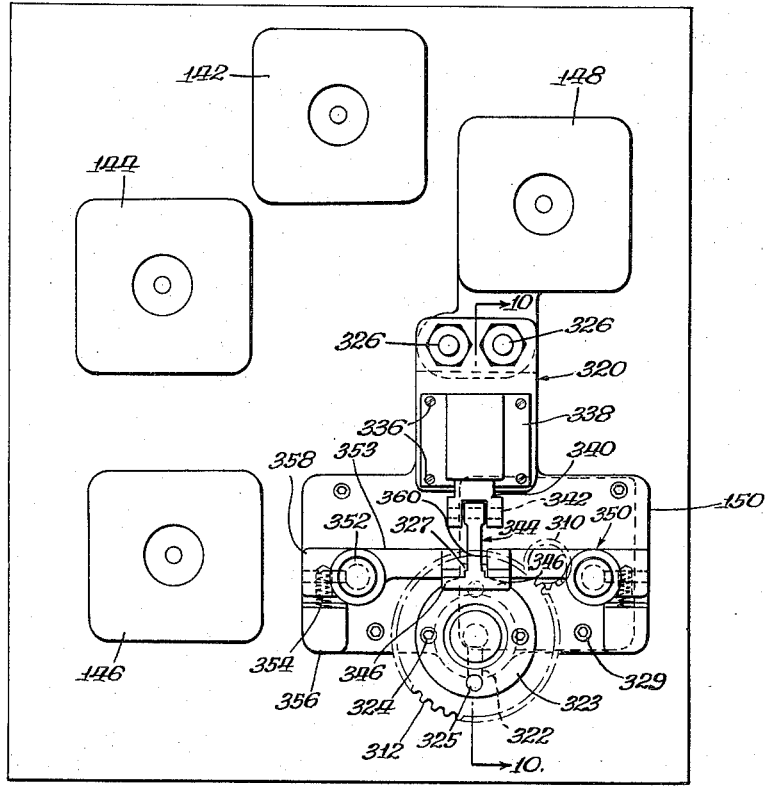
Figure 9 is a view along line 9—9 of Figure 4 showing the electro-mechanical interlock.
Figure 10:
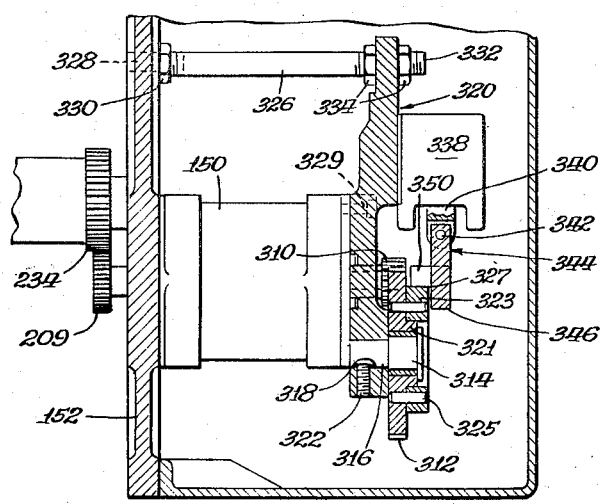
Figure 10 is a view along line 10—10 of Figure 9.

In addition to the mechanical interlock already described, an electrically controlled interlock and brake arrangement is provided. Referring to Figures 9 and 10, it is seen that the torque motor 150 has its drive shaft projecting from both ends, one end of the drive shaft carrying the pinion 209 which engages segment 234 as described heretofore and the opposite end carrying a pinion 310 which is engageable with a stop gear 312. The stop gear 312 is rotatably mounted on a shoulder pin 314, the smaller end 316 of which is received in an opening 318 of a housing bracket 320. The shoulder pin 314 may be held in assembled relationship in any conventional manner, as for example, by means of set screw 322.

The stop gear 312 is provided with a hub portion 321 on which is received a cam plate 323 which is held in position by means of a plurality of pins 325 and secured by cap screws 324. A stop lug 327 projects radially outward from the periphery of the cam plate 323.

The housing bracket 320 is supported on the torque motor 150 by means of cap screws 329 and additional support is provided for the bracket by means of a pair of spacer studs 326. The spacer studs 326 are received in threaded openings 328 in motor plate 152 and locked in position by means of a nut 330. Each spacer stud 326 is also provided with threads 332 at the opposite end thereof and this opposite end is received through the housing bracket and the assembly maintained by means of a pair of lock nuts 334. Secured to the outer face of the housing bracket 320, by means of a plurality of machine screws 336, is a solenoid 338 having a solenoid arm 340 to which is pivotally connected, by means of a pin 342, a solenoid link generally indicated at 344.

The lower portion of the solenoid link 344 is in the shape of an inverted T-section having transversally extending arms 346.

It should be noted that when the gear unit 78 and gear segment 234 are in neutral position, the stop lug 327 is aligned with the solenoid link 344 as shown in Figure 9.

Also supported on the housing bracket 320 are a pair of spaced stop arms 350 pivotally mounted, as at 352, to the housing 320. A leg 353 of each stop arm 350 is transversally aligned with the solenoid link 344 and adapted to bear against a related arm 346 of the link and is urged into contact thereagainst by a spring 354 compressed between a projecting lug 356 of the bracket 320 and an outwardly projecting short leg 358 of the stop arm 350.

When, as will be described hereinafter, the electrical controls call for movement of the gear unit 78 and, consequently, of the stop gear 312 out of neutral position, the solenoid 338 is energized to lift the link 344 upwardly. The link 344 in turn lifts the stop arms 350 out of engagement with the stop lug 327 to permit the associated torque motor 150 to rotate the stop gear 312 in either a clockwise or counterclockwise direction, as required. The solenoid is then deenergized whereupon the leg 344 drops to the position shown in Figure 9 while the springs 354 maintain contact between the stop arms and the solenoid link. Assuming for the moment that the stop gear 312 has been rotated in a counterclockwise direction as seen in Figure 9 and, at a later time, the gear unit 78 and stop gear 312 are moved to the neutral position, the stop lug 327, in moving to the neutral position, urges the leg 352, which is to the left of the solenoid link, upwardly to accommodate passage of the stop lug. However, the stop lug, immediately upon reaching neutral position, comes into contact with the face 360 of the stop arm which is positioned to the right of the solenoid link and thereby cannot move past the neutral position.

The manner of operation of the feed box transmission herein described may be best explained with reference to the electrical wiring diagram of Figure 11 and in conjunction with a vertical boring mill to which the transmission is particularly adapted. In the present instance, the transmission is applied to the selection of a plurality of tool feeds which are obtainable for any given rate of table rotation.

The desired feed rates are preselected at the pendant station of the vertical boring mill through the use of a 24-position master-slave rotary solenoid selection device as explained in detail in the aforementioned copending application Serial No. 492,382. As explained in said copending application, in order to preselect a particular feed rate, the machine operator turns the knob of a 24-position master tap switch to the proper position. The 24-position slave rotary solenoid automatically rotates to match the position of the tap switch and then stops. Wafers on the rotary solenoid assembly in turn set up circuits for use during the actual feed change. The feed change, as mentioned heretofore, is accomplished through use of five small torque motors on the feed box which move the necessary gears to obtain the new rate of travel. Power to each torque motor is applied through a reversing contactor. It should be noted again that torque motors 142, 144, 146, and 148 drive gears which have two positions while torque motor 150 moves a gear which has three positions. As also mentioned heretofore, limit switches are provided to ensure that all gears reach their proper position during a feed change.

In the wiring diagram, portions of the circuit from line 1 to line 2 are shown in different portions of the drawing for purposes of clarity. It should be noted also that the points 370 and 372 indicated on the left-hand side of the diagram are identical with the points 370 and 372 shown at the right-hand side of the diagram.

When the table is running, either contacts CR–R or

CR-F, which are controlled by the table circuit, are closed and the table is always running when a shift is made to ensure meshing of the gears.

To initiate a feed change the operator momentarily depresses the feed change button 374 to close contacts 373 and open contacts 375 thereof and to complete a circuit from line 1, through contacts 373 and through the coil CR-34-D of relay CR-34 to line 2. Relay CR-34 is a latch type relay having two coils, CR-34-D and CR-34-P, which control contacts CR-34-1 and CR-34-2. When one of the coils is energized to close a set of contacts and open the opposite set of contacts, the relay latches in that position and so remains until the other of the two coils is subsequently energized. It should be noted that when relay coil CR-34-D is energized, contacts CR-34-1 are closed and CR-34-2 are open. Conversely, when relay coil CR-34-P is energized, the contacts CR-34-1 are open and the contacts CR-34-2 are closed.

A circuit is now completed through the contacts 373, normally closed contacts CR-31-5, contacts CR-F, contacts CR-34-1, contacts TDR-1 and the coil of relay CR-30 to line 2. Energizing relay CR-30 closes normally open contacts CR-30-1 to lock in relay CR-30 even though contacts 373 may be open. Energizing relay CR-30 also closes normally open contacts CR-30-2. If at this time the gear unit 78 is in the neutral position, contacts 276a-1 of switch 276a are held closed by gear segment 234. It will be understood by those familiar with this art that limit switches of the type utilized herein may have one pair of contacts for simple make and break circuits or, alternately, may be provided with two sets of contacts, one of which will be open while the other is closed. Limit switches 276 and 276a are of the latter type.

With contacts 276a-1 held closed a circuit is completed to energize relay CR-31 which is locked in by means of contacts CR-31-1. If, however, the gear unit 78 is not in the neutral position, then contacts 276a-1 are held open and contacts 276a-2 are closed by the gear segment 234. In this instance, it is necessary to provide some means to indicate on which side of neutral position the gear unit 78 and gear segment 234 are so that the gear motor will rotate in the proper direction to return these elements to the neutral position. Switch 276 is utilized as a directional switch and is provided with two pairs of contacts, namely 276-1 and 276-2. When the gear unit 78 is to the right of center as viewed in Figure 1, contacts 276-1 are closed and 276-2 are open. Conversely, when the gear unit 78 is to the left of neutral as viewed in Figure 1, contacts 276-2 are closed and contacts 276-1 are open. In either case, releasing the feed change button causes a circuit to be completed through contacts 375, contacts CR-30-2, contacts 276a-2, either of the contacts 276-1 or 276-2, and either the coil of relay CIL or CIR (depending on which side of neutral the gear unit 78 happens to be) and to line 2. Energizing relay CIL or CIR closes contacts CIL-2 or CIR-2 to energize the torque motor 150 in the proper direction to move the gear unit 78 and gear segment 234 to the neutral position. When the gear unit 78 reaches the neutral position, contacts 276a-2 are opened and 276a-1 are closed to energize relay CR-31 which locks in the same manner as described heretofore. It should be noted that if gear unit 78 is not in the neutral position, it is always brought to the neutral position before any shifting of the other gears is accomplished. This particular feature is included as a safety measure.

Energizing relay CR-31 also causes CR-31-2 to open, thereby breaking the circuit to the motor control relays and stopping the motor 150. Energizing relay CR-31 also closes contacts CR-31-6, CR-31-3 and CR-31-4 to permit energization of the proper motor starter coils (AR, AL, CR, etc.) which have been preselected by the rotary solenoid wafers, whereby the associated motors 142, 144, 146, 148, and 150 are energized and the proper gears shifted in one or the other direction depending upon the particular feed which had been selected. Energizing relays AR, AL, and so forth, as required also closes the associated interlock contacts AR-1, AL-1, CR-1, and so forth, so that coil CR-34-P is energized only when all of the required contacts are closed.

It will be recalled that one or the other set of limit switch contacts for each shifting gear unit is closed depending on the particular position of the gear unit. Referring to Figure 11, it is apparent that if the interlock contacts AL-1, AR-1, etc. were omitted then any combination of positions of the gear units would cause a circuit to be completed through coil CR-34-P, and it is for this specific reason that the interlock contacts are provided.

Utilization of these interlock contacts, however, prepares a particular path through which a circuit may be completed to coil CR-34-P, but the circuit will not be energized until all of the torque motors have moved their related gear units and gear segments into the desired position at which time the proper limit switch contacts are closed to make a complete circuit from line 1 to line 2. For example, if interlock contacts AL-1 are closed, that portion of the circuit cannot be energized until limit switch contacts 222 are closed and this will not occur until the related gear reaches, or was already in, its proper position.

The torque motors which have thus been energized move the segments and related gears to the proper position to obtain the preselected feed rate unless the particular gear unit 36, 76, 84, and 96 was already in the required position. As each gear reaches its position, its associated gear segment closes its associated limit switch and when all of the gears have reached their final position, a circuit is completed to energize the coil CR-34-P of relay CR-34. Energization of coil CR-34-P opens contacts CR-34-1 thereby breaking the circuit to relay CR-30 and, simultaneously, closes contacts CR-34-2 to permit energization of the feed box clutches, the operation of which is explained in the aforementioned copending application.

If, however, the gear unit 78 were in neutral position and for the particular new feed rate which has been preselected, the gear unit 78 is required to remain in the neutral position, relay CR-32 is provided and is energized through the rotary solenoid control wafer. When relay CR-32 is energized, contacts CR-32-1 are opened to prevent the solenoid 338 from energizing. In this instance the braking arrangement of Figure 9 holds the segment 312 in neutral position. On the other hand if gear unit 78 must be moved, relay CR-32 remains de-energized and contacts CR-32-1 remain closed so that solenoid 338 is energized to permit rotation of the gear segment by the associated torque motor.

An interlock by-pass circuit generally indicated at 380 in Figure 11 is provided as an additional safety feature. If, for example, gear unit 78 is required to remain in neutral position, neither of the limit switches 276b or 276c can be closed by the gear segment 234. Therefore, the interlock by-pass circuit is used in order to energize coil CR-34-P. The contacts CR-31-5 are closed when relay CR-31 is energized at the time the gear unit 78 contacts CR-32-2 are also closed because relay CR-32 reaches neutral position as described heretofore. The contacts CR-32-2 are also closed because relay CR-32 is energized as called for by the wafer and as described earlier.

After a particular feed change has been selected and initiated, it is not desirable for the rotary solenoid selector device to be able to energize its various contactors if accidentally moved to a different position by the operator. Normally closed contacts CR-30-3 are, therefore, provided and are opened when relay CR-30 is energized to isolate the selector dial rotary solenoid coil so that the selector knob can be turned to any position with no effect on the selection previously made. Normally open contacts CR–30–4 are provided to prevent energization of any portions of the motor control circuit until actually called for by energization of the relay CR–30.

In order to protect the intermittent duty torque motors, a timer TDR is provided which locks in when relay CR–30 is energized. This relay is automatically de-energized after a predetermined time interval if a complete gear shift fails to occur. De-energization of relay TDR opens contacts TDR–1 to thereby de-energize relay CR–30. De-energization of relay CR–30 opens contacts CR–30–4 to completely de-energize the feed change circuit.

We claim:

1. A transmission comprising: an input shaft, an output shaft, and at least one intermediate shaft; a plurality of gears on each of said shafts, certain of said gears being shiftable axially of said shafts for selective engagement with other of said gears; and shifter means for each shiftable gear, each of said means comprising a yoke operatively engageable with the related shiftable gear, a rack secured to said yoke for movement therewith, a pinion engageable with said rack, a timing gear movable in unison with said pinion, individual motor means for driving said timing gear, and means associated with said timing gear for stopping the motor when the timing gear and shiftable gear reach a predetermined position, said last-mentioned means comprising cam means on the timing gear, and a plurality of limit switches arranged to be opened and closed by said cam means in response to movement of said timing gear.

2. A transmission for providing a plurality of output speeds for any given input speed comprising: an input shaft and an output shaft; a plurality of gears on each of said shafts, certain of said gears being shiftable axially of the related shaft; and means responsive to rotation of said input shaft in either direction for driving said output shaft in a single direction only, said last-mentioned means comprising a reversing shaft, a pair of over-running clutches carried by said output shaft and said reversing shaft respectively, gear means carried by said reversing shaft for driving said output shaft in one direction through the output shaft clutch while said reversing shaft is running in a given direction and said reversing shaft clutch is over-running, and means including a reversing gear for driving said output shaft through the reversing shaft clutch in said one direction when said reversing shaft is running in a direction opposite to said given direction.

3. A transmission for providing a plurality of output speeds for any given input speed comprising: an input shaft and an output shaft; a plurality of gears on each of said shafts, certain of said gears being shiftable axially of the related shaft; and means responsive to rotation of said input shaft in either direction for driving said output shaft in a single direction only, said last-mentioned means comprising an output gear keyed to said output shaft for rotation therewith, a first over-running clutch carried by said output shaft, a first clutch gear carried by said first clutch, a reversing shaft gear keyed to said reversing shaft and engageable with said first clutch gear for driving said output shaft when said reversing shaft is rotating in one direction, a second over-running clutch carried by said reversing shaft, a second clutch gear carried by said second clutch and engageable with said output gear for driving engagement therewith when said reversing shaft is rotating in a direction opposite to said one direction.

4. A transmission for providing a plurality of output speeds for any given input speed comprising: an input shaft and an output shaft; at least one intermediate shaft; a plurality of gears on each of said shafts, certain of said gears being shiftable axially of said shafts for selective engagement with other of said gears; a torque motor operatively associated with each of said certain gears for imparting said axial shifting movement thereto; means for converting the rotary motion of said motor to axial motion of said gears and including a gear segment; means responsive to movement of said gear segment for stopping said motor when the related shiftable gear reaches a predetermined position; and means responsive to rotation of said input shaft in either direction for driving said output shaft in a single direction only.

5. A transmission comprising: an input shaft; an output shaft; means including at least one intermediate shaft for driving said output shaft at any of a plurality of speeds for any given input speed; a plurality of gear means on said input shaft; a pair of shiftable gears splined on said intermediate shaft for rotation therewith and axial movement therealong for selective driving engagement with certain of said input shaft gears, said shiftable gears comprising a mechanical interlock for accommodating driving engagement of one of said shiftable gears only when the other of said shiftable gears is in a neutral position.

6. A transmission comprising: an input shaft; an output shaft; means including at least one intermediate shaft for driving said output shaft at any of a plurality of speeds for any given input speed; a plurality of gear means on said input shaft; a pair of shiftable gears splined on said intermediate shaft for rotation therewith and axial movement therealong for selective driving engagement with certain of said input shaft gears, said shiftable gears comprising a mechanical interlock for accommodating driving engagement of one of said shiftable gears only when the other of said shiftable gears is in a neutral position, said interlock comprising a first gear segment operatively connected with one of said shiftable gears, a second gear segment operatively connected with the other of said shiftable gears, flange portions on respective gear segments, said gear segments having portions thereof interfering to prevent rotary motion of said first segment and engagement of said one gear when said second segment is in a position to engage said other gear, the flange on said second segment having slots therein arranged to receive the flange portion of said first segment when said second segment is in a position to disengage said other gear whereby said first segment may be moved to engage said one gear.

7. In a transmission system the combination of: a housing, an input shaft and an output shaft; means for driving said output shaft at any of a plurality of speeds for any given speed of the input shaft, said means comprising at least one auxiliary shaft; a plurality of gear means on each of said shafts, certain of said gear means being in constant engagement with other of said gear means; a shifting gear on said auxiliary shaft selectively movable axially of said auxiliary shaft to a neutral position or to one of two engaged positions; motor means operatively connected with said shifting gear for imparting said axial movement thereto; a stop gear operatively connected to said motor means for movement thereby; a stop lug on said stop gear; a pair of arms pivotally mounted on said housing, said arms being arranged to receive and lock said stop lug therebetween when said shifting gear is in neutral position; electrically operated means for pivoting said arms to permit rotation of said stop gear and corresponding movement of said shifting gear to either of said engaged positions when said electrically operated means is energized; said levers being arranged, when said electrical means are de-energized, to accommodate movement of said stop gear to neutral position and lock said stop gear in neutral position until a subsequent energization of said electrical means.

8. In a transmission system the combination of: a housing, an input shaft and an output shaft; means for driving said output shaft at any of a plurality of speeds for any given speed of the input shaft, said means comprising at least one auxiliary shaft; a plurality of gear means on each of said shafts, certain of said gear means being in constant engagement with other of said gear means; a shifting gear on said auxiliary shaft selectively movable axially thereof to a neutral position or to one of two engaged positions; motor means operatively connected to said shifting gear for imparting said axial movement thereto; rotary means adapted to be rotated by said motor means to three positions corresponding to the neutral position and the two engaged positions of said shifting gear, stop means for accommodating movement of said rotary means into neutral position and for locking said rotary means therein; and means associated with said stop means for actuating the latter to accommodate movement of said rotary means out of neutral position.

9. In a transmission system having a plurality of shafts and means for driving one of said shafts at a plurality of speeds for any given speed of another of said shafts, said means comprising: gear means on said shafts, the gear means on one of said shafts being shiftable to a neutral position and to one of two positions where it is selectively engageable with certain of the gear means on the other of said shafts; motor means for shifting said shiftable gear means; rotary means adapted to be rotated by said motor means to three positions corresponding to the neutral position and the two engaged positions of said shiftable gear; means for accommodating movement of said rotary means into neutral position and for locking said rotary means therein; and means associated with said locking means for actuating the latter to accommodate movement of said rotary means out of neutral position.

10. A transmission comprising: an input shaft, an output shaft, and at least one intermediate shaft; a plurality of gears on each of said shafts, certain of said gears being shiftable axially of said shafts for selective engagement with other of said gears; shifter means for said shiftable gears, each of said shifter means comprising a shifter yoke, a rack carried by said yoke for movement therewith, a pinion engageable with said rack, said pinion having timing means moveable therewith, individual motor means for driving said timing means, and means associated with said timing means for stopping the motor when the timing means and the related shiftable gear have reached a predetermined position, said last mentioned means comprising cam means carried by the timing means, and a plurality of switches arranged for actuation by said cam means in response to movement of said timing means.

References Cited in the file of this patent

UNITED STATES PATENTS

| | | |
|---|---|---|
| 2,397,092 | Drexler et al. | Mar. 26, 1946 |
| 2,501,994 | Dewey | Mar. 28, 1950 |

FOREIGN PATENTS

| | | |
|---|---|---|
| 170,540 | Switzerland | July 15, 1934 |
| 740,557 | Germany | Oct. 23, 1943 |
| 894,569 | France | Dec. 28, 1940 |
| 667,043 | Great Britain | Feb. 20, 1952 |

UNITED STATES PATENT OFFICE

CERTIFICATE OF CORRECTION

Patent No. 2,947,189                                August 2, 1960

Theodore Foster et al.

It is hereby certified that error appears in the printed specification of the above numbered patent requiring correction and that the said Letters Patent should read as corrected below.

Column 10, line 62, strike out "contacts CR-32-2 are also closed because relay CR-32".

Signed and sealed this 4th day of April 1961.

(SEAL)
Attest:    ERNEST W. SWIDER

Attesting Officer                                    ARTHUR W. CROCKER
                                                             Acting Commissioner of Patents